United States Patent [19]

Repolovsky et al.

[11] 4,080,875
[45] Mar. 28, 1978

[54] VEHICLE BRAKING MEANS

[76] Inventors: Alexandr Ivanovich Repolovsky, ulitsa Kerchenskaya 10, korpus 2, kv. 53; Ilya Kharitonovich Pakhter, ulitsa Semashko 5, kv. 10a; Alexei Dmitrievich Rudakov, prospekt Mira, 184, korpus 2, kv. 298; Alexandr Nikolaevich Baranov, Leningradsky prospekt, 28, kv. 160; Leonid Efimovich Gliner, ulitsa Chekhova 31/22, kv. 103; Dmitry Trdatovich Gapoian, ulitsa Onezhskaya 31, kv. 110; Igor Veniaminovich Tumasiants, 4 Novo-Mikhailovsky proezd 6, kv. 149, all of Moscow, U.S.S.R.

[21] Appl. No.: 683,683

[22] Filed: May 5, 1976

Related U.S. Application Data

[63] Continuation of Ser. No. 598,816, Jul. 24, 1975, abandoned, which is a continuation of Ser. No. 498,666, Aug. 19, 1974, abandoned, which is a continuation of Ser. No. 366,079, Jun. 1, 1973, abandoned.

[51] Int. Cl.² ............................................. F01B 9/00
[52] U.S. Cl. ....................................... 92/29; 92/20; 92/63; 92/129; 92/130 A

[58] Field of Search ............... 92/20, 29, 14, 30, 52, 92/62, 63, 64, 129, 130 A, 21 R, 21 MR; 188/170

[56] References Cited

U.S. PATENT DOCUMENTS

| 2,559,478 | 7/1951 | Stone | 92/30 |
|---|---|---|---|
| 2,717,579 | 9/1955 | Leduc | 92/29 |
| 3,183,791 | 5/1965 | Cruse | 92/63 |
| 3,255,676 | 6/1966 | Berg | 92/64 |
| 3,498,188 | 3/1970 | Rodriquez | 92/29 |
| 3,556,149 | 1/1971 | Ribier | 92/29 |
| 3,782,251 | 1/1974 | Le Marchand | 92/63 |

*Primary Examiner*—Martin P. Schwadron
*Assistant Examiner*—Abraham Hershkovitz
*Attorney, Agent, or Firm*—Holman & Stern

[57] ABSTRACT

A vehicle braking means is disclosed in which an auxiliary chamber 2 comprises a locking mechanism whose function is to lock together a piston 5 and a piston rod 16. The locking mechanism comprises a spring-loaded guide 19 and locking elements 20 arranged to constantly contact the guide 19 and to engage the piston 5. To release the vehicle brakes, provision is made of a rod 21 or a pushrod 43 extending from the auxiliary chamber 2. As compared with the constructions known currently, the auxiliary chamber 2 is more readily operable and convenient in use.

5 Claims, 14 Drawing Figures

VEHICLE BRAKING MEANS

This is a continuation of application Ser. No. 598,816 filed July 24, 1975 which in turn is a continuation of Ser. No. 498,666 filed Aug. 19, 1974, which in turn is a continuation of Serial No. 366,079 filed June 1, 1973, all three of which are now abandoned.

BACKGROUND OF THE INVENTION

This invention relates to vehicle braking means and can be used as an emergency, standby or parking brake in any vehicle.

There is known a vehicle braking means comprising a braking mechanism housed in a main chamber to which is attached an auxiliary chamber accommodating a spring-loaded piston and a hollow piston rod adapted to actuate the braking mechanism, there being provided a locking mechanism for the purpose of locking the piston and rod together, the locking mechanism being adapted for connection to a release mechanism.

The auxiliary chamber housing has an external circular flange provided for attachment to the main chamber housing. The braking mechanism comprises a diaphragm gripped between the housings of the main and auxiliary chambers, the two housings being held together by a clamp. The auxiliary chamber housing is closed by a cover having a cylindrical portion coaxial with the housing. Made integral with the cover and coaxially therewith is an internal thin-walled cylinder of a smaller diameter. The end of this cylinder projects outward beyond the housing and cover. The space formed between the cylindrical portion of the cover and the internal cylinder houses a piston spring. The space above the piston is filled with a fluid medium under pressure immediately after mounting the auxiliary chamber on the vehicle. The piston has a hollow endpiece which is made integral therewith and is arranged to fit into the cover interior cylinder so that the piston abuts against the end of the cylinder.

The outward end of the piston endpiece has a threaded sleeve to receive a release bolt the head of which is situated outside the auxiliary chamber housing where it is readily accessible.

The shank of the release bolt passes inside the piston endpiece and bears against the piston rod located in the auxiliary chamber housing. One end of the piston rod passes through a hole in the end wall of the auxiliary chamber housing, whereas the other end fits through a spacer ring installed in the piston endpiece. Formed in the piston rod end behind the spacer ring is a groove for a locking ring intended to prevent the piston rod from coming out of the piston endpiece. The other end of the piston rod, which extends through a hole in the chamber end wall, mounts a thrust flange. The outward end of the cover interior cylinder carries a protection cap.

A drop of the pressure of the fluid medium in the space above the auxiliary chamber piston, which may result from leaks in the fluid medium supply lines or from an intentional pressure release, causes the piston together with the release bolt and the piston rod to move, by the action of the piston spring, towards the main chamber and to actuate the braking mechanism through the main chamber diaphragm, thereby applying the vehicle brakes.

In order to release the vehicle brakes manually without supplying a fluid medium under pressure into the space above the auxiliary chamber piston, the release bolt is screwed out to permit the reaction of the braking mechanism to move the piston rod. Under these conditions, the release bolt also holds the piston and the piston rod together so that they move bodily during the operation of the auxiliary chamber. The piston rod moves until its thrust flange abuts against the end wall of the chamber housing.

In order to prepare the auxiliary chamber for operation, a fluid medium is supplied under pressure into the space above the piston, whereby the piston is forced into the initial position, compressing its spring. With this condition obtained, the release bolt is screwed in, up to the end of the piston rod.

One of the disadvantages of the construction under consideration is that considerable time is taken to screw out the bolt for releasing the vehicle brakes when there is no pressure of a fluid medium in the auxiliary chamber as well as to screw in the bolt when supplying a fluid medium under pressure to prepare the auxiliary chamber for operation. Further, it is rendered beyond practice to provide a simultaneous remote control of several auxiliary chambers of the known design.

SUMMARY OF THE INVENTION

It is an object of this invention to eliminate the disadvantages mentioned above and to provide a braking means that will be more readily operable and more convenient to use.

This and other objects are achieved by providing a vehicle braking means comprising a braking mechanism housed in a main chamber to which is attached an auxiliary chamber accommodating a spring-loaded piston and a hollow piston rod adapted to actuate the braking mechanism, there being provided a locking mechanism for the purpose of locking the piston and rod together, the locking mechanism being adapted for connection to a release mechanism.

According to the invention, the locking mechanism comprises a spring-loaded guide located inside said hollow piston rod and at least two locking elements seated in holes formed through the piston rod wall, the locking elements being arranged to constantly contact the guide and to engage the piston for the purpose of locking the piston and its rod together in the initial position and during the operation of the auxiliary chamber.

This construction provides for quickly releasing the vehicle brakes.

In one of the embodiments of this invention the guide is constructed in the form of a cylinder tapering towards a circular groove shaped to conform to the mating portions of the locking elements so that these elements can be fully seated when they are disengaged from the piston. The diameter of the guide cylindrical portion is dimensioned so as to enable the guide to bring the locking elements into engagement with the piston and thereby to lock the piston and its rod solid. For connecting the guide to a release mechanism, provision is made of a rod which passes through an axial hole formed in the guide and extends beyond the auxiliary chamber housing.

This construction of the guide and, in particular, its connection with a release mechanism, permit of quickly releasing the vehicle brakes and provide for centralized control of locking mechanisms in several auxiliary chambers.

In another embodiment the guide is constructed in the form of a cylinder round the periphery of which are provided with double recesses, one for each locking element. One portion of each double recess is shaped so as to seat the associated locking element when it is disengaged from the piston. The other portion is shaped so as to seat the locking element when it is engaged with the piston. For connecting the guide to a release mechanism, the former is provided with an endpiece fitted on which is a torsional spring secured at one end to the endpiece and at the other end to the piston rod.

The use of the torsional spring permits of reducing the space between the auxiliary chamber and the associated units on the vehicle, facilitates its mounting and operation and provides for centralized control of locking mechanisms in several auxiliary chambers.

In a further embodiment of the invention the guide is constructed in the form of two integral coaxial cylinders of different diameter with a taper between them. The diameters are dimensioned so that the large cylinder is able to bring the locking elements into engagement with the piston and the small cylinder permits the locking elements to fully disengage from the piston. A compression spring is fitted inside the piston rod between its end wall and the guide. Fitted at the other end of the guide are a guide travel stop and a pushrod which extends from the auxiliary chamber housing.

This construction of the auxiliary chamber provides for a repeated manual brake application after the auxiliary chamber has operated.

In order to simplify the construction of the locking mechanism, it is desirable for the locking elements in the embodiments described above to be made in the form of balls.

BRIEF DESCRIPTION OF THE DRAWINGS

Now the invention will be described in detail with reference to the accompanying drawings in which.

DETAILED DESCRIPTION OF THE PREFERRED EMBODIMENTS

The vehicle braking means which constitutes the present invention comprises a main chamber 1 (FIG. 1) and an auxiliary chamber 2. The main chamber 1 is of the conventional design.

Figure 1:
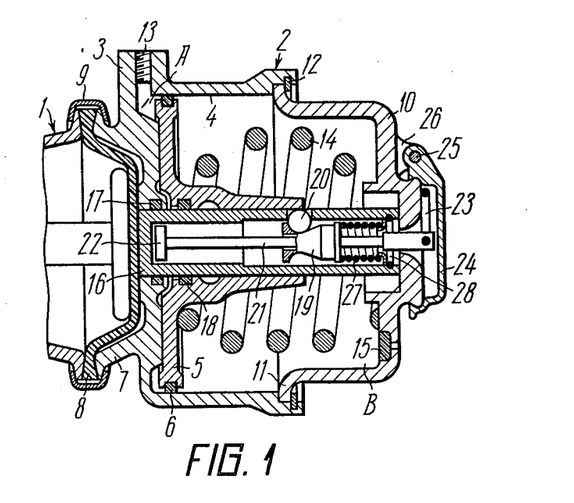
FIG. 1 is a longitudinal sectional view of the auxiliary chamber, according to the invention, showing the position of the parts at the installation of the chamber on the vehicle.

The auxiliary chamber 2 of the braking means has a housing 3 made in the form of a cylindrical casting with a bore 4 to accommodate a piston 5. A groove into which is fitted a sealing ring 6 is formed in the piston periphery.

The housing 3 has an external circular flange 7 provided for attachment to the housing of the main chamber 1. The braking mechanism housed in the main chamber 1 comprises a diaphragm 8 which is gripped between the housings of the main chamber 1 and the auxiliary chamber 2. The housing 3 is held to the housing of the main chamber 1 by a clamp 9.

The housing 3 is closed by a cover 10 which is made in the form of a casting provided with a flange 11. The flange 11 is held to the housing 3 by a locking ring 12 fitted into a circular groove which is formed in the bore 4 of the housing 3.

The piston 5 divides the auxiliary chamber 2 into two spaces. The space A, which is formed by the side and end walls of the housing 3 and by the end face of the piston 5 (FIG. 2), is to be filled with a fluid medium after the auxiliary chamber 2 is mounted on the vehicle. For this purpose a filling hole 13 is provided in the housing 3.

Figure 2:
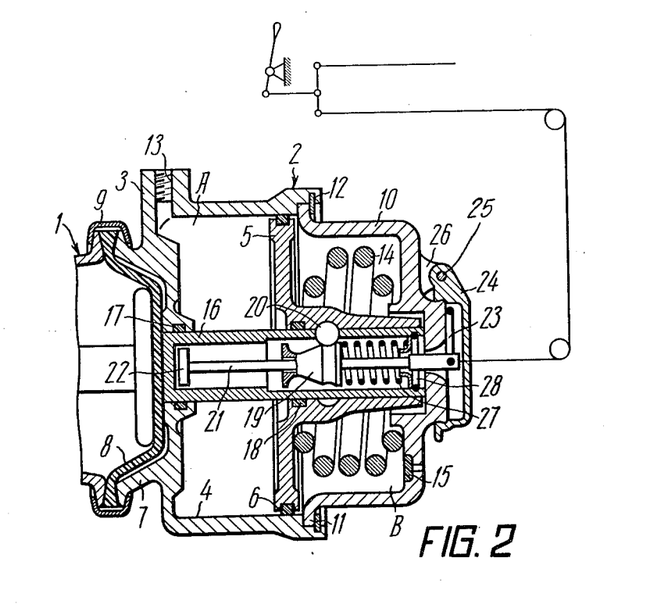
FIG. 2 is a longitudinal sectional view of the auxiliary chamber showing the parts in the initial position (the auxiliary chamber is prepared for operation).

The space B, which is formed between the cover 10 and the other end face of the piston 5, accommodates a compression spring 14 one end of which bears against the piston 5 and the other against the cover 10. In order to prevent entry of dust into this space during the operation of the auxiliary chamber 2, a dust excluding filter 15 is fitted in a hole provided in the cover 10.

The piston 5 has a through axial cylindrical hole. A hollow piston rod 16 passes through this hole and also through a bore provided in the end wall of the housing 3. This bore is grooved to fit a scaling ring 17. The hole in the piston 5 is also grooved to fit a seal 18.

The connection between the piston 5 and the piston rod 16 is effected by a locking mechanism which, according to the invention, comprises a spring-loaded guide 19 located inside the hollow piston rod 16 and at least two locking elements 20 seated in through holes equidistantly spaced round the circumference of the piston rod 16. In the embodiment under consideration, the locking elements 20 are made in the form of balls arranged to constantly contact the guide 19.

The piston 5 has a circular groove for the locking elements to engage partially therein and thereby to lock the piston 5 and the piston rod 16 together in the initial position and during the operation of the auxiliary chamber 2.

In this embodiment of the invention, the guide 19 is constructed in the form of a cylinder tapering towards a circular groove shaped to conform to the mating portions of the locking elements 20 so that these elements can be fully seated in the groove when they are disengaged from the piston 5. The diameter of the guide cylindrical portion is dimensioned so as to enable the guide to bring the locking elements 20 into engagement with the piston 5 and thereby to lock solid the piston 5 and piston rod 16.

The maximum depth, the minimum depth and the width of the circular groove in the guide 19 are determined by the dimensions of the locking elements 20, whilst these dimensions are determined by the load which the locking elements 20 have to deal with during the operation of the auxiliary chamber 2.

Formed in the guide 19 is an axial hole through which is freely passed a rod 21 provided for the purpose of manually operating the locking mechanism or connecting it to a remote control lever arranged to operate several auxiliary chambers 2. The left (as shown) end of the rod 21 is provided with an abutment 22. The right end of the rod 21 has a pull ring 23 attached to it. This end of the rod 21 fits through a hole in the cover 10 and is closed by a protection cap 24 which is pivoted by means of a pin 25 to a bracket 26 made integral with the cover 10. Located inside the piston rod 16 is a compression spring 27 which bears at one end against the right (as shown) end of the guide 19 and at the other end against a locking ring 28 fitted in a groove provided in the piston rod 16. The function of the spring 27 is to return the locking elements 20 and the guide 19 into the initial position after the vehicle brakes have been released.

Figure 5:
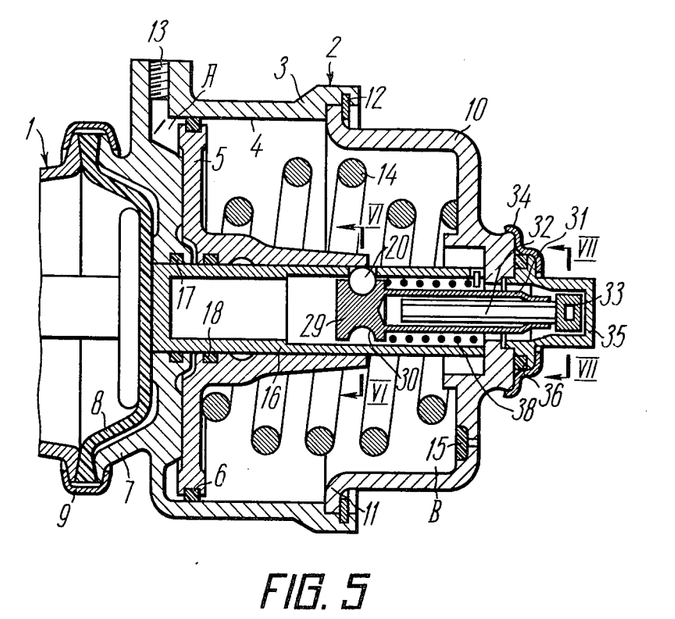
FIG. 5 is a longitudinal sectional view of an embodiment of the auxiliary chamber showing the position of the part at the installation of the chamber on the vehicle and on brake release.
Figure 6:
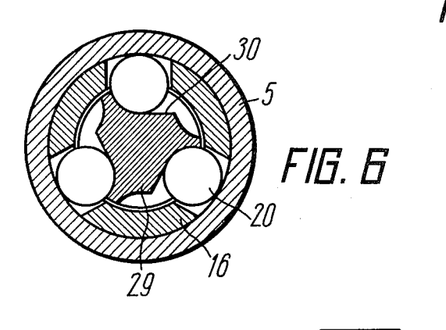
FIG. 6 is a section view taken along the line VI—VI of FIG. 5.

In another embodiment (FIG. 5) the locking mechanism has a guide 29 made in the form of a cylinder round the periphery of which are provided with double recesses 30 (FIG. 6). One portion of each recess 30 is shaped so as to seat the associated locking element 20 when it is disengaged from the piston 5 and the other portion of the recess 30 is shaped so as to the seat the locking element 20 when it is engaged with the piston. The maximum depth, the minimum depth and the width of the recesses 30 are determined by the dimensions of the locking elements 20, whilst these dimensions are determined by the load which the locking elements 20 have to deal with during the operation of the auxiliary chamber 2.

The guide 29 is made integral with a hollow endpiece 31 which accommodates a rod 32 with a head 33. The endpiece 31 is provided for the purpose of connecting the guide 29 of the locking mechanism to a release mechanism. The end of the endpiece 31 is necked around the rod 32. The endpiece 31 and the rod 32 extend through a hole in the cover 10.

Figure 7:
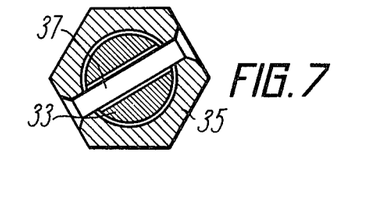
FIG. 7 is a section view taken along the line VII—VII of FIG. 5.

The head 33 of the rod 32 fits into a hexagon 35 (FIG. 7) which is fixed to the cover 10 by a retainer 34. The joint between the cover 10 and the hexagon 35 is made tight by a sealing ring 36. The hexagon 35 is secured to the head 33 by a pin 37 passed through holes in the two parts. Where necessary, the hexagon 35 is connected through a linkage to a remote control lever arranged to operate locking mechanisms in several auxiliary chambers 2.

Fitted inside the piston rod 16 is a torsional spring 38 one end of which is secured in a hole provided in the wall of the endpiece 31 and the other end in a groove provided at the end of the piston rod 16. The spring 38 rests upon one of the side surfaces of the groove.

In a further embodiment (FIG. 11) the locking mechanism of the auxiliary chamber 2 comprises a guide 39 which is constructed in the form of two integral coaxial cylinders of different diameter with a taper between them. The diameters are dimensioned so that the large cylinder brings the locking elements 20 into engagement with the piston 5 and the small cylinder permits the locking elements to fully disengage from the piston. The difference in diameter between the large and small cylinders is determined by the dimensions of the locking elements 20, whilst these dimensions are determined by the load which the locking elements 20 have to deal with during the operation of the auxiliary chamber 2.

Figure 11:
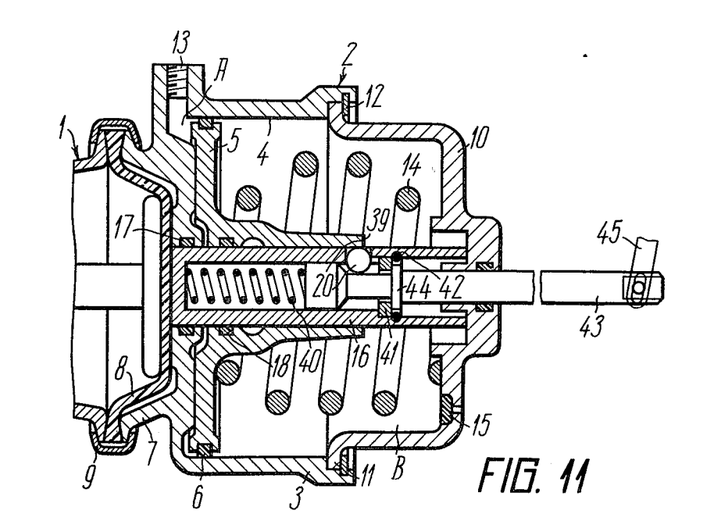
FIG. 11 is a longitudinal sectional view of a further embodiment of the auxiliary chamber showing the position of the parts at the installation of the chamber on the vehicle and on brake release.

Fitted inside the piston rod 16 between its end wall and the left (as shown) end of the guide 39 is a compression spring 40. Fitted inside the piston rod 16 at the other end of the guide 39 is a guide travel stop 41 secured by a locking ring 42.

Formed in the cover 10 coaxially with the guide 39 is a hole through which a pushrod 43 is passed, the end part of the pushrod fitting inside the piston rod 16. The pushrod 43 is provided with a stop 44 which prevents it from coming out of the chamber 2. The end of the pushrod 43 which extends from the chamber 2 is movably connected with a lever 45 arranged to operate the locking mechanism.

Where necessary, the lever 45 is connected through a linkage to a remote control lever 46 arranged to operate locking mechanisms in several auxiliary chambers.

The condition of the auxiliary chamber 2 prior to operations is as follows: the chamber A is filled with a fluid medium under pressure, the piston 5 is in the extreme right position, holding the spring 14 compressed, the locking elements 20 engage in the circular groove in the piston 5 and bear upon the cylindrical surface of the guide 19.

The vehicle braking means operates as follows:

A drop of the pressure of the fluid medium in the space A of the housing 3, which may result from leaks in the fluid medium supply lines or from an intentional pressure release, brings the auxiliary chamber 2 into operation.

Figure 3:
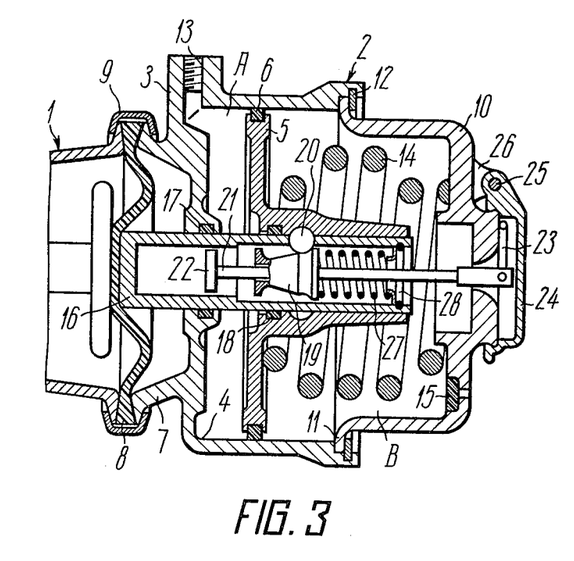
FIG. 3 is a longitudinal sectional view of the auxiliary chamber showing the position of the parts on brake application.

When the spring 14 overcomes the pressure in the space A of the housing 3 it moves the piston 5 together with the piston rod 16 towards the main brake chamber 1. The left (as shown) end of the piston rod 16 comes up against the diaphragm 8 and moves it to the left, thereby bringing the braking mechanism into action. The piston 5 and the piston rod 16 move bodily until the vehicle brakes are fully applied.

Figure 4:
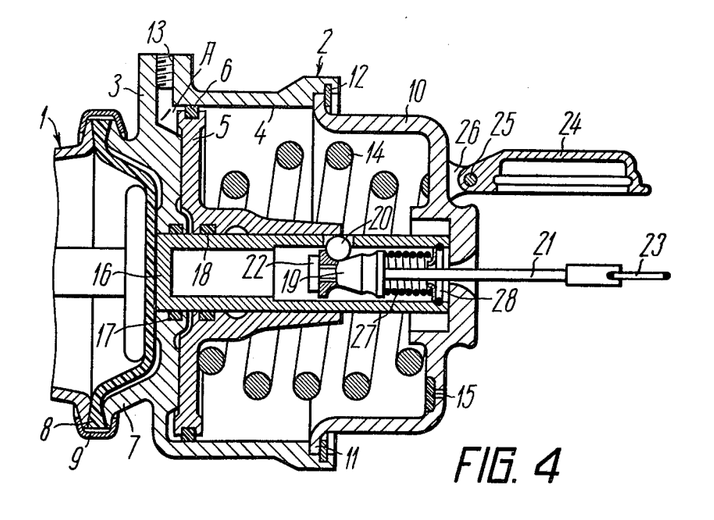
FIG. 4 is a longitudinal sectional view of the auxiliary chamber showing the position of the parts on brake release.

In order to release the vehicle brakes manually, the protection cap 24 is swung open and the ring 23 is pulled to move the rod 21 to the right. The abutment 22 of the rod 21 pushes the guide 19, permitting the locking elements 20 to disengage from the piston 5.

As the guide 19 is pushed inside the piston rod 16, the locking elements 20 move on its taper toward the circular groove gradually coming out of engagement with the piston 5.

As the guide 19 is moved by means of the rod 21, it compresses the spring 28 located inside the piston rod 16.

After the locking elements 20 fully disengage from the piston 5, the reaction of the braking mechanism causes the piston rod 16 to move to the right, up to the cover 10, the vehicle brakes getting released.

In order to prepared the auxiliary chamber 2 for operation, a fluid medium is supplied under pressure into the space A through the hole 13 in the wall of the housing 3. The pressure of the fluid medium forces the piston 5 all the way to the right, compressing the spring 14. Just as the circular groove in the piston 5 registers with the locking elements 20, the spring 28 moves the guide 19 to the left and the guide taper brings the locking elements 20 into engagement with the piston 5, thereby locking the piston 5 and the piston rod 16 together.

In the other embodiment of the invention the chamber 2 operates as described above, whereas release is effected in the following way:

The hexagon 35 is turned clockwise. The movement of the hexagon 35 is transmitted through the rod 32 and the endpiece 31 to the guide 29 which turns, winding the torsional spring 38 and permitting the locking elements 20 to disengage from the piston 5 and thus to unlock the piston rod 16 therefrom. The reaction of the braking mechanism causes the piston rod 16 to move to the right, up to the cover 10, the vehicle brakes getting released. The hexagon 35 cannot be turned further since the locking elements 20 hold the guide 29 locked to the piston 5.

Figure 8:
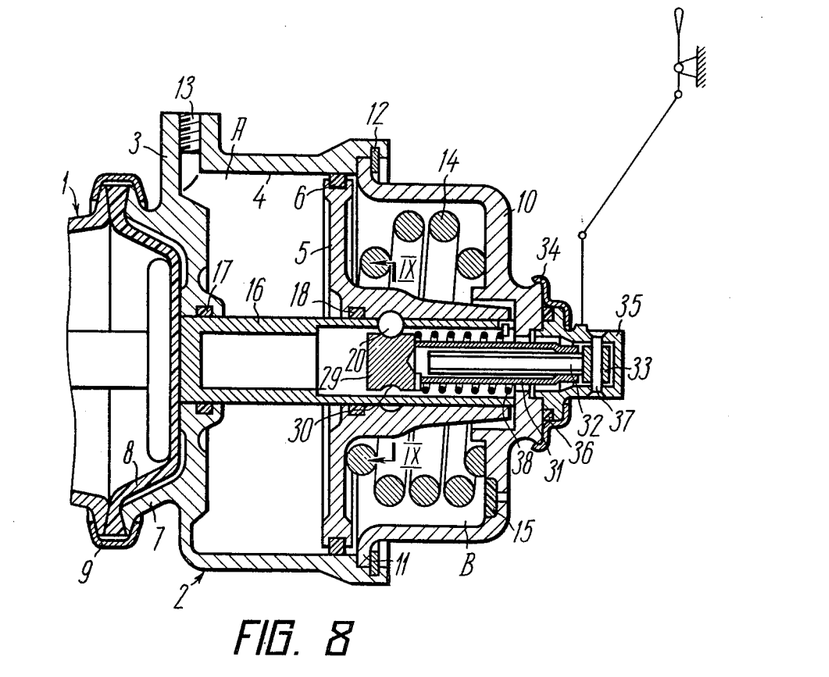
FIG. 8 is a longitudinal sectional view of an embodiment of the auxiliary chamber showing the parts in the initial position.
Figure 9:
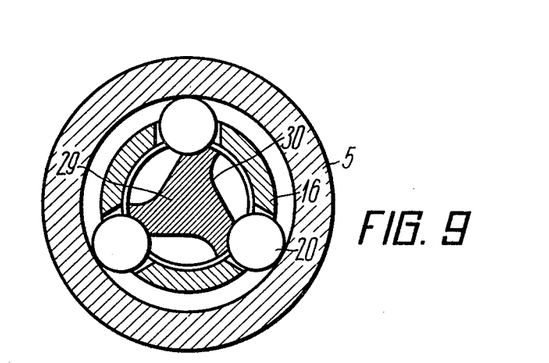
FIG. 9 is a section view taken along the line IX—IX of FIG. 8.
Figure 10:
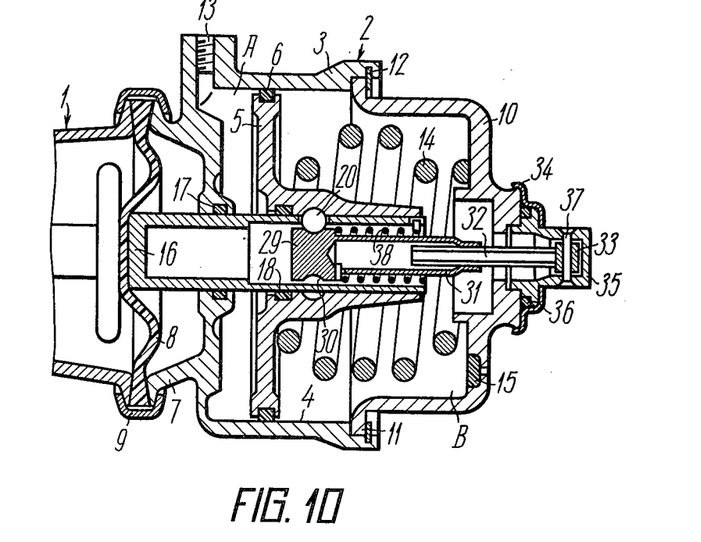
FIG. 10 is a longitudinal sectional view of an embodiment of the auxiliary chamber showing the position of the parts on brake application.

The piston 5 is set into the initial position in the same was as described above. When the circular groove in the piston 5 registers with the locking elements, the spring 38 (wound when releasing the brakes) unwinds, turning the guide 29 counter-clockwise. The locking elements 20 are caused to move from the recesses 30 into engagement with the piston 5, whereby the piston 5 and the piston rod 16 are locked together.

In the further embodiment of the invention the chamber 2 operates in the same way as described previously, whereas release is effected in the following manner:

When the pushrod 43 is operated by means of the lever 45, it moves to the left, up to the stop 41, pushing the guide 39 and compressing the spring 40. When the locking elements 20 come into contact with the small cylindrical portion of the guide 39, they disengage from the piston 5 and unlock the piston rod 16 therefrom. The reaction of the braking mechanism causes the piston rod 16 to move to the right, up to the cover 10, the vehicle brakes getting released.

Figures 12, 13:
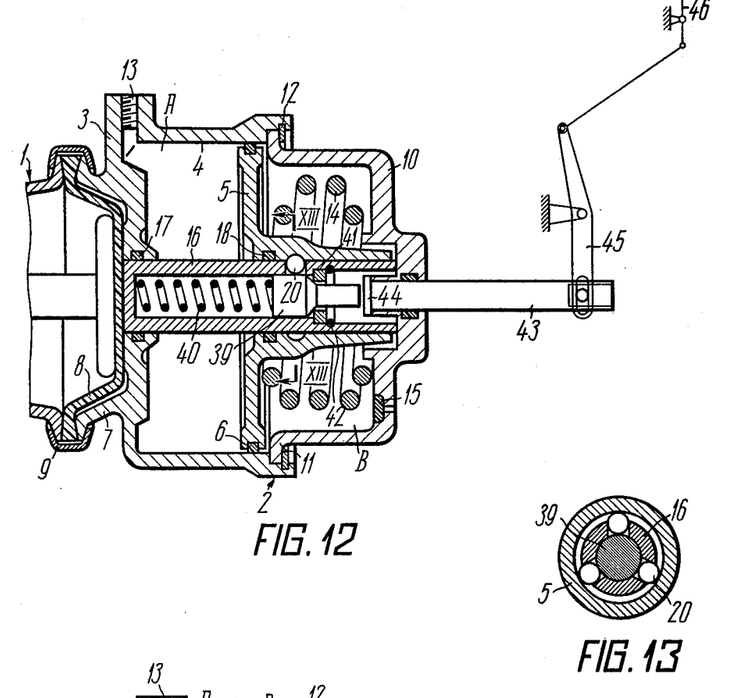
FIG. 12 is a longitudinal sectional view of a further embodiment of the auxiliary chamber showing the parts in the initial position.
FIG. 13 is a section view taken along the line XIII—XIII of FIG. 12.

In order to prepare the auxiliary chamber 2 for operation, a fluid medium is supplied under pressure into the space A through the hole 13. The pressure of the fluid medium forces the piston 5 to the right, compressing the spring 14. Just as the circular groove in the piston 5 registers with the locking elements 20, the spring 40 moves the guide 39 to the right and the guide taper brings the locking elements 20 into engagement with the piston 5, thereby locking the piston 5 and the piston rod 16 together.

Figure 14:
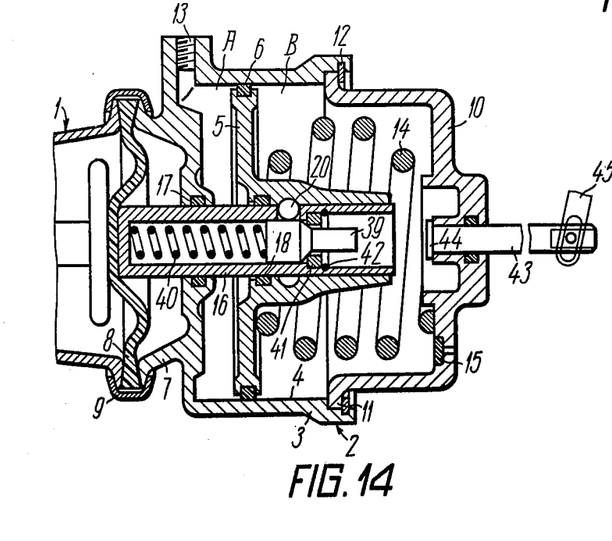
FIG. 14 is a longitudinal sectional view of a further embodiment of the auxiliary chamber showing the position of the parts on brake application.

When operating vehicles, particularly trailers, need may arise (for example, in changing the parking place) for repeated application of the brakes without filling the space A in the housing 3 of the auxiliary chamber 2 with a fluid medium. The embodiment under consideration provides for this mode of operation. For the purpose the pushrod 43 is moved to the left, up to the stop 43, by operating the lever 45. The movement of the pushrod 43 brings the piston rod 16 against the diaphragm 8, putting the braking mechanisn into action and there by applying the vehicle brakes. The lever 45 is commonly provided with a locking device to hold it in the applied position.

What is claimed is:

1. In a vehicle braking means comprising, in combination: a first housing defining a main chamber; a second housing attached to said first housing defining an auxiliary chamber; brake actuating mechanism contained in said main chamber; a piston accomodated in the auxiliary chamber, said piston having a bore therethrough a spring loading said piston in a brake applying direction; a piston rod accommodated in said auxiliary chamber slidably mounted in said bore of said piston and arranged for actuating said brake actuating mechanism; pressure fluid means for applying pressure to hold said piston against the action of said spring; locking means for releasably locking said piston rod and said piston together; and releasing means for manually releasing said locking means after said piston rod actuates said brake actuating mechanism following a loss of pressure, the improvement wherein said piston rod is hollow; said locking means and said releasing means are disposed within said piston rod; said locking means comprises at least one locking ball, said bore of said piston having an inscribed circumferential groove, and said piston rod having at least one opening on its circumference through which said at least one locking ball can partially pass, whereby said piston and said piston rod are locked together when said locking ball is seated in said groove; and said releasing means comprises guide means operatively associated with said at least one locking ball and disposed within said piston rod, said guide means having first and second surfaces, said first surface for holding said at least one locking ball seated in said groove, said second surface for allowing said at least one locking ball to be released from said groove thereby unlocking said piston rod from said piston, spring means for urging said guide means so that said first surface is contacting said at least one locking ball, and actuating means for moving said guide means against the action of said spring means so that said second surface is contacting said at least one locking ball thereby releasing said locking means.

2. The improvement of claim 1 wherein said guide means comprises a cylinder longitudinally aligned with said piston rod, said guide means having an axial bore, opposite ends and first and second portions, said first surface comprises the outer circumference of the first portion of said cylinder, said second surface comprises a circumferential groove in the second portion of said cylinder deep enough to allow said at least one locking ball to be released from the groove in said bore of said piston, said first portion tapering smoothly to said second portion and said actuating means comprises a tie rod operativly associated with said cylinder to move the same so that said at least one locking ball moves into said groove in said second portion thereby unlocking said piston rod from said piston.

3. The improvement of claim 2 wherein said second portion of said cylinder is on the brake applying direction end of said cylinder, said spring means being a helically coiled spring pressing the opposite end of said cylinder and said tie rod extends through said axial bore of said cylinder and through an opening in the second housing.

4. The improvement as claimed in claim 1, in which said guide means comprises a cylinder around a periphery of which are provided double recesses constituting said first and second surfaces, one double recess for each of said locking ball, one portion of each of said double recesses being shaped so as to seat the associated locking ball when it is disengaged from said piston and the other portion being shaped so as to seat said locking ball when it is engaged with said piston, and wherein said guide means is provided with an endpiece on which is fitted said spring means in the form of a torsional spring secured at one end to said endpiece and at the other end to said piston rod for connecting said guide means to the actuating means.

5. The improvement as claimed in claim 1, in which said guide means comprises two integral coaxial cylinders of different diameter with a taper between them, the cylinder diameters being dimensioned so that the large cylinder forming said first surface is able to bring said at least one locking ball into engagement with said piston and the small cylinder forming said second surface permits said at least one locking ball to disengage from said piston, and wherein said spring means comprises a compression spring fitted inside said piston rod between its end wall and said guide means, and a guide travel stop and a pushrod which extends from the housing of said auxiliary chamber are fitted to the other end of said guide means to form said actuating means.

* * * * *